United States Patent
Subramanian

(10) Patent No.: US 12,473,410 B2
(45) Date of Patent: Nov. 18, 2025

(54) DEPOLYMERIZED LIGNOSULFONATE AND LIGNIN AS EXTENDER FOR PHENOLIC RESIN

(71) Applicant: Wilsonart LLC, Austin, TX (US)

(72) Inventor: Mahesh Subramanian, Centerville, OH (US)

(73) Assignee: WILSONART LLC, Austin, TX (US)

( * ) Notice: Subject to any disclaimer, the term of this patent is extended or adjusted under 35 U.S.C. 154(b) by 125 days.

(21) Appl. No.: 18/311,650

(22) Filed: May 3, 2023

(65) Prior Publication Data

US 2023/0357518 A1    Nov. 9, 2023

Related U.S. Application Data

(60) Provisional application No. 63/364,088, filed on May 3, 2022.

(51) Int. Cl.
  *C08J 5/24*    (2006.01)
  *B32B 29/00*   (2006.01)

(52) U.S. Cl.
  CPC ............. *C08J 5/246* (2021.05); *B32B 29/005* (2013.01); *C08J 5/245* (2021.05); *C08J 5/248* (2021.05); *B32B 2250/26* (2013.01); *B32B 2250/40* (2013.01); *B32B 2260/028* (2013.01); *B32B 2260/046* (2013.01); *C08J 2300/00* (2013.01); *C08J 2497/00* (2013.01)

(58) Field of Classification Search
  CPC .................................................. B32B 2250/25
  See application file for complete search history.

(56) References Cited

U.S. PATENT DOCUMENTS

| | | | | |
|---|---|---|---|---|
| 4,402,780 | A | * | 9/1983 | Ogoe ..................... B29C 70/40 156/308.2 |
| 2021/0009618 | A1 | * | 1/2021 | Jobber ..................... C08J 5/245 |

OTHER PUBLICATIONS

"Characterization of a Novolac Resin Substituting Phenol by Ammonium Lignosulfonate as Filler or Extender," Perez et al., BioResources 2 (2) p. 270-283, 2007 (Year: 2007).*
Perez et al (Year: 2007).*

* cited by examiner

*Primary Examiner* — Ian A Rummel
(74) *Attorney, Agent, or Firm* — Welsh Flaxman & Gitler LLC

(57) ABSTRACT

A resin composition for impregnating paper products used in manufacture of high-pressure decorative laminates includes a resin and lignin derivatives.

11 Claims, 2 Drawing Sheets

DEPOLYMERIZED LIGNOSULFONATE AND LIGNIN AS EXTENDER FOR PHENOLIC RESIN

CROSS REFERENCE TO RELATED APPLICATION

This application claims the benefit of U.S. Provisional Patent Application No. 63/364,088, entitled "DEPOLYMERIZED LIGNOSULFONATE AND LIGNIN AS EXTENDER FOR PHENOLIC RESIN," filed May 3, 2022, which is incorporated herein by reference.

BACKGROUND OF THE INVENTION

1. Field of the Invention

The current invention relates to resin compositions for impregnating paper products used in the manufacture of high-pressure decorative laminates.

2. Description of the Related Art

High-pressure decorative laminates are made of layers of paper treated with thermosetting resins and polymerized with a process combining pressure and temperature as described below. The application of pressure and temperature allow the flow of the impregnated resins and a variety of resin compositions are known for use depending upon needs and budgets.

SUMMARY

In one aspect a resin composition for impregnating paper products used in manufacture of high-pressure decorative laminates comprises a resin and lignin derivatives.

In some embodiments the lignin derivatives are lignosulfonate and kraft lignin processed via sulfate/sulfite treatments.

In some embodiments the lignosulfonate is ammonium lignosulfonate (LAS).

In some embodiments the resin composition is formaldehyde free.

In some embodiments lignin derivatives are converted to bio-phenols or bio-epoxies to produce converted lignins.

In some embodiments the converted lignins are mixed with non-formaldehyde compounds to produce the resin composition.

In some embodiments the converted lignins are mixed/reacted with formaldehyde compounds to produce the resin composition.

In some embodiments the converted lignins are mixed with regular fossil-based phenol and a resin derived with suitable crosslinkers.

In some embodiments the resin composition is prepared according to a method comprising mixing and cooking ammonium lignosulfonate, acetic acid, and methanol; adding KOH or MgO and epicholorohydrin; cooking the mixture; mixing and cooking, with the mixture produced above, water, DOSS (Dioctyl sulfosuccinate sodium salt), resin, KOH, glyoxal, and methanol; and adjusting to desired pH and viscosity.

In another aspect a high-pressure decorative laminate includes a decorative layer and a core layer composed of at least one resin impregnated sheet of core paper, which is impregnated with a resin composition comprising a resin and lignin derivatives.

In some embodiments the decorative layer and the resin impregnated core sheet are layered to form a laminate lay-up and the laminate lay-up is heated and pressed to consolidate and cure the high-pressure laminate.

In some embodiments the high-pressure decorative laminate further includes an overlay paper layer.

In some embodiments the core layer includes two sheets of 160 to 550 grams/meter$^2$ resin impregnated Kraft paper.

In some embodiments the Kraft paper is impregnated with the resin composition and is partially cured (β-staged).

In some embodiments the Kraft paper is impregnated with a resin content of approximately 28% to 37%.

In some embodiments the core layer includes an impregnation enhancing surfactant composition including an anionic surfactant and a non-ionic surfactant.

In some embodiments the core paper includes no more than 20% to 50% recycled materials.

In some embodiments the core paper includes an impregnation enhancing surfactant composition.

In some embodiments the impregnation enhancing surfactant composition includes an anionic surfactant and a non-ionic surfactant.

In some embodiments the anionic surfactant is selected from the group consisting of Sodium Dodecylbenzenesulfonate (SDBS), ethoxylated alcohol, Sodium Bis(2-Ethylhexyl) Sulphosuccinate (Sodium Dioctyl Sulphosuccinate (DOSS) or Docusate Sodium), Alkyldiphenyloxide Disulfonate, and Alkyl Benzene sulfonate.

In some embodiments the non-ionic surfactant is selected from the group consisting of glycol ether and dimethylamides of unsaturated fatty acid.

In some embodiments the anionic and non-ionic surfactants of the impregnation enhancing surfactant composition need to be balanced to create lower surface energy and fiber activity to saturate resin as an encapsulant on the fiber.

Other objects and advantages of the present invention will become apparent from the following detailed description when viewed in conjunction with the accompanying drawings, which set forth certain embodiments of the invention.

DESCRIPTION

The detailed embodiments are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present invention provides a resin composition for impregnating paper products used in the manufacture of high-pressure decorative laminates. As is explained below in greater detail, the resin composition of the present invention combines lignin derivatives, for example, lignosulfonate and kraft lignin processed via sulfate/sulfite treatments, into the resin composition. The lignin-derived resin composition of the present invention provides a resin composition at costs comparable to currently available resin. The lignin-derived resin composition of the present invention also obviates supply chain issues and provides an environmentally friendlier resin. The lignin-derived resin composition of the present invention may be produced in a formaldehyde free manner addressing environmental concerns and complying with various regulatory standards.

As will be appreciated based upon the following disclosure, the lignins are first converted to bio-phenols or bio-epoxies, which are commonly termed as Eugenol derivatives. The converted lignins are then mixed with non-formaldehyde compounds (and other amines, anhydrides) to produce the lignin-derived resin composition of the present invention. It is also appreciated the converted (or depolymerized) lignins may be mixed/reacted with formaldehyde compounds to produce other lignin-derived resin compositions, which although include formaldehyde do offer other advantages based upon the inclusion of the lignin derivative. The depolymerized lignin can also be mixed with regular fossil-based phenol and a resin derived with suitable cross-linkers. The catalyst used in resin making can be alkali resources of Na, K, Mg, Ba and also borates, sulfites, and sulfates.

Figure 1:
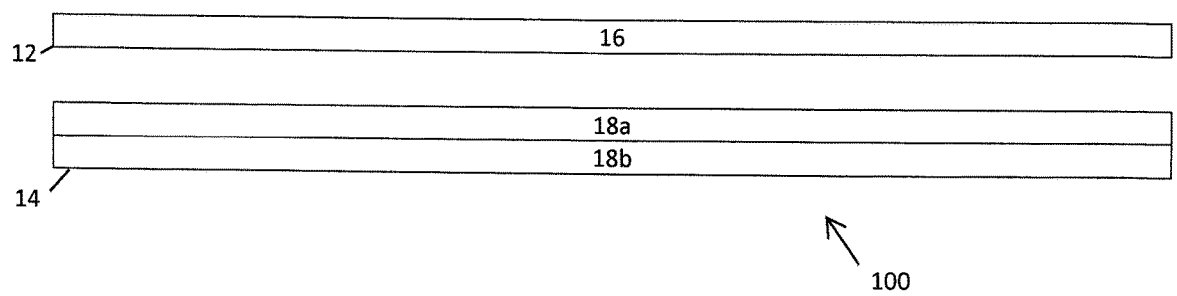
FIG. 1 is a schematic of a laminate lay-up.
Figure 2:
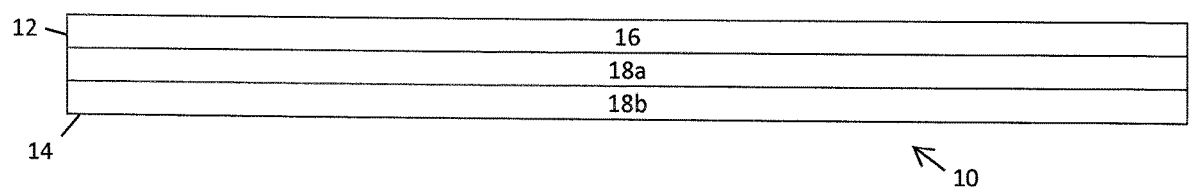
FIG. 2 is a schematic of a high-pressure decorative laminate in accordance with the present invention.

In accordance with a disclosed embodiment, and as shown with reference to FIGS. 1 and 2, the lignin-derived resin composition is used with a high-pressure decorative laminate 10 that includes a decorative layer 12 and a core layer 14. The decorative layer 12 is composed of a resin impregnated decorative paper 16 (also referred to herein as "resin impregnated decorative sheet") or dry, unimpregnated decorative paper with a resin impregnated overlay sheet as discussed below. The core layer 14 is composed of at least one resin impregnated sheet of core paper 18a, 18b (sometimes referred to herein as "resin impregnated core sheet"), which is impregnated with the lignin-derived resin composition. The high-pressure decorative laminate 10 is manufactured by preparing the resin impregnated decorative sheet 16 and preparing at least one resin impregnated core sheet 18a, 18b. Preparing the at least one resin impregnated core sheet 18a, 18b includes impregnating the core sheet with the present lignin-derived resin composition. The resin impregnated decorative paper 16 and the resin impregnated core sheet 18a, 18b are layered to form a laminate lay-up 100 (see FIG. 1) and the laminate lay-up is heated and pressed to consolidate and cure the high-pressure decorative laminate 10 (see FIG. 2).

Figure 3:
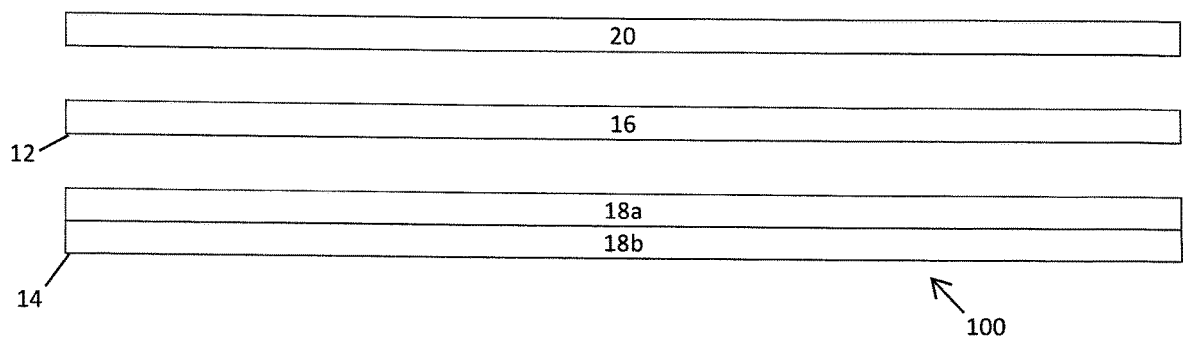
FIG. 3 is a schematic of an alternate laminate lay-up.
Figure 4:
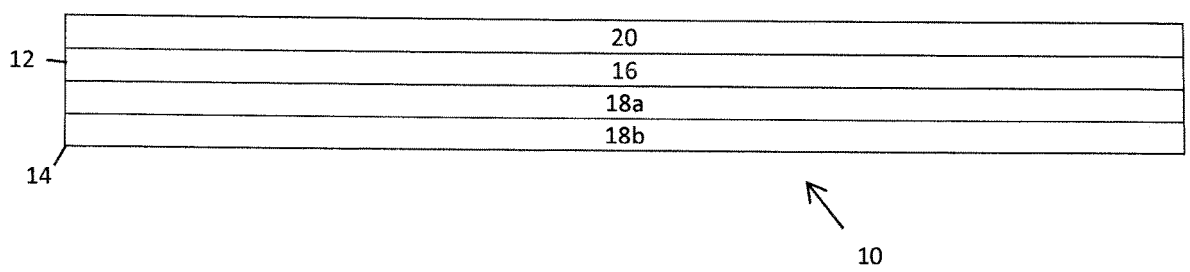
FIG. 4 is a schematic of the high-pressure decorative laminate in accordance with FIG. 3.

In accordance with some embodiments of the present disclosure, and as shown in FIGS. 3 and 4 (where similar reference numerals are used for similar elements), the high-pressure decorative laminate 10 may include an overlay paper layer 20, a decorative layer 12 (impregnated decorative paper or dry, unimpregnated decorative paper), and a core layer 14. It should be appreciated, however, that the layering pattern may be varied, somewhat, without departing from the spirit of the present disclosure.

The decorative layer 12 is composed of a conventional resin impregnated decorative paper 16 positioned directly above (and/or below in other variations) the core layer 14. The decorative layer 12 is chosen from a wide array of sheets. For example, the decorative layer 12 may be a solid color (for example, white) or may include an aesthetically appealing pattern. Where the decorative layer defines the top surface of the final high-pressure decorative laminate, the decorative layer dictates the surface characteristics of the final high-pressure decorative laminate. For example, the composition of the decorative layer dictates the high-pressure decorative laminate's resistance to chemical agents, heat, light, shock, and abrasion. While a decorative layer composed of a single resin impregnated sheet is disclosed herein, it is appreciated the decorative layer may be composed of two or even three sheets.

As discussed above, the decorative layer 12 is composed of a sheet of resin impregnated decorative paper 16. The decorative sheets are commonly manufactured from high quality 60 grams/meter$^2$ to 205 grams/meter$^2$, pigment filled, alpha cellulose paper impregnated with amino plastic resin or/and polyurethane acrylate resin. Although the following disclosure discusses a resin impregnated decorative paper, it is appreciated a dry, unimpregnated decorative paper may be used (so long as a resin impregnated overlay sheet is positioned above the dry, unimpregnated decorative paper, in a manner known in the art, such that the dry, unimpregnated decorative paper is positioned between the overlay sheet and the core layer. The decorative paper, in accordance with an embodiment of the present disclosure, is impregnated with a resin content of approximately 0% to 82% (considering 0% accounts for the embodiment described above using a dry, unimpregnated decorative paper in conjunction with a resin impregnated overlay sheet). The resin impregnated decorative sheets are subsequently dried, partially cured, and finally cut into sheets. The pigment filled, alpha cellulose paper of the decorative sheet may include a solid color, a decorative design, or a rotogravure reproduction of natural materials, such as, wood, marble, leather, etc. The aesthetic characteristics of the cellulose paper are revealed as the high-pressure decorative laminate's decorative design upon completion of the high-pressure decorative laminate.

The core layer 14 is preferably composed of a plurality of resin impregnated core sheets 18a, 18b of what is commonly referred to as "saturating Kraft paper." While saturating Kraft paper is disclosed herein, it is appreciated, the paper used in the core is not limited to saturating Kraft paper, and papers made from recycled fibers that are suitable for laminates applications are known. For example, Kruger produces a paper made of 100% recycled fibers that is suitable for laminates applications. Further, it is appreciated other paper materials and other volumes of sheets may be used without departing from the spirit of the present disclosure.

In accordance with a disclosed embodiment, the core layer 14 includes two resin impregnated core sheets 18a, 18b of 160 grams/meter$^2$ to 550 grams/meter$^2$ resin impregnated Kraft paper. The saturating Kraft paper is impregnated with the lignin-derived resin composition and is partially cured (β-staged). The saturating Kraft paper is impregnated with a resin content of approximately 28% to 37%.

As briefly discussed above, the lignin-derived resin composition of the present invention includes lignin derivatives, for example, lignosulfonate. As is appreciated, lignosulfonate is a lignin converted liquid recovered from spent pulping liquids. Filtration is commonly used to separate the lignosulfonates from the spent pulping liquid.

Among lignosulfonates, ammonium lignosulfonates (LAS) are considered the most appropriate for formulating phenol formaldehyde resins due to the essential groups or properties of lignosulfonates which make them a potential substitute for phenol in phenol formaldehyde resins. Phenol formaldehyde resins contain various degrees of cross-linking, and a spectrum of molecular sizes and substitutions that allow quick gelation at the right pH.

Ammonium lignosulfonates show increased conversion to phenol entities at high temperatures exceeding 120° C. for a period of at least 3 hours when subjected to organic acids. Further breakdown of ammonium lignosulfonates has been reported by use of catalytic processes in alcohol solution under guidance of Purdue University (for example, see U.S. Pat. No. 10,630,206, which is incorporated herein by reference). The ammonium lignosulfonates, which are a byproduct of the Purdue University process, are preferably used in the resin systems described below.

In accordance with one embodiment, the lignin-derived resin composition is prepared using a dual cook process as follows. 100 parts by weight ammonium lignosulfonate (obtained as a waste product from the catalytic processes conducted by Purdue University as disclosed in U.S. Pat. No. 10,630,206), 3 parts by weight acetic acid, and 15 parts by weight methanol are mixed and cooked for approximately 1 hour at 120° C. This may be thickened as desired and known in the art. 6 parts by weight KOH, potassium hydroxide, (10 parts in 33 parts water) (or alternatively 10% MgO, magnesium oxide, in water at 25 parts ortho groups/fast cycle (33%)) and 5 parts by weight epicholorohydrin (for example, POLYCUP™ 172 (crosslinking resin by Solenis)) are then added to the mixture, and the mixture is cooked for approximately 1 hour at 90° C. The cooking time can be accommodated to develop a viscosity which is related to molecular weight. The cook can be independent if other cross-linkers are used or can be in-situ with phenol-formaldehyde. While ammonium lignolate obtained as a waste product from the catalytic processes conducted by Purdue University as disclosed in U.S. Pat. No. 10,630,206 is used in accordance with a disclosed embodiment, other lignin-based materials, for example, Kraft lignin(sulfite) may be used without departing from the spirit of the present invention.

30 parts by weight of the resin produced above is then mixed with 5 parts by weight water, 0.25 parts by weight DOSS (Dioctyl sulfosuccinate sodium salt), 70 parts CPL (Continuous Press Laminate) resin (for example, as made by Arclin) at pH 7.5, 2 parts by weight KOH (10 in 33 parts $H_2O$) at pH 7.2+, 5 parts by weight glyoxal (40%), and 3 parts by weight (if needed) methanol and the mixture is cooked. In particular, the mixture is cooked at 70° C. to 75° C. and cooled to 25° C. It is appreciated that the cook time and the cook itself are optional to achieve desired laminate properties. The mixture should have a final pH 7.6 (approximately) and the viscosity is adjusted as desired with the addition of water:methanol in a ratio of 3:1. The viscosity desired is 100±30 cSt at 25° C. The typical methanol amount will be 10% at maximum to comply to closed cup flash point to be above 160° F.

While the above lignin-derived resin composition works well when used to impregnate conventional Kraft paper, improved saturation may be achieved using Kraft paper manufactured as follows. As is explained below in detail, an impregnation enhancing surfactant composition is integrated into the core paper during the paper manufacturing process for enhancing the saturating characteristics of the resulting core paper, and the core paper is subsequently impregnated with the lignin-derived resin composition of the present invention and used in the manufacture of high-pressure decorative laminate.

In accordance with a preferred embodiment, the impregnation enhancing surfactant composition integrated into the core paper during the paper manufacturing process includes an anionic surfactant and a non-ionic surfactant. The anionic surfactant is, for example, a sulfonated surfactant, an ethoxylated alcohol, or a combination of the sulfonated surfactant and an ethoxylated alcohol. The non-ionic surfactant is, for example, a glycol ether or a fatty amide release agent. As will be appreciated based upon the following disclosure, various additives may be included with the impregnation enhancing surfactant composition without departing from the spirit of the present invention.

As briefly discussed above, the core layer of a high-pressure decorative laminate in accordance with the present invention is composed of first and second resin impregnated sheets of core paper, although other volumes of sheets may be used without departing from the spirit of the present disclosure. The core paper is manufactured in the following manner.

An aqueous fluid containing cellulosic pulp and other papermaking ingredients is first formed in a pulper in a conventional manner. In accordance with a preferred embodiment, the aqueous fluid should contain no more than 20% to 50% recycled materials. Included amongst the other paper making ingredients is the impregnation enhancing surfactant composition and other additive(s). The addition of beater starch can be part of the formulation as it can aid in sizing aid. The beater starch can be rosin based, Alkyl Succinic Acid (ASA), Alkyl Ketene Dimer (AKA), or Acrylic based.

In accordance with a preferred embodiment, and considering the addition of the impregnation enhancing surfactant composition, the pulper uses a fan-pump. As those skilled in the art will appreciate, the fan-pump propels the slurry toward the headbox of the paper machine in a manner keeping the basis weight constant over time and avoiding "barring." Polyethyleneimine (PEI) type pulps are ideally recommended in accordance with the present invention; currently available PEI type pulpers for use in accordance with the present invention are manufactured by Kymmene, Amres and/or Cascomid. As those skilled in the art will appreciate, PEI functions as a retention agent that improves the retention of a functional chemical in a substrate. PEI is preferably added in the wet end of the paper machine to improve retention of fine particles and fillers during the formation of paper. Retention aids can also be used to improve the retention of other papermaking chemicals, including sizing and cationic starches. The improved retention of papermaking components improves the operational efficiency of the paper machine, reduces the solids and organic loading in the process water loop, and can lower overall chemical costs. It also reduces paper fuzz, a nuisance in treating.

The mixture of the impregnation enhancing surfactant composition includes an anionic surfactant and a non-ionic surfactant. The impregnation enhancing surfactant composition may also include various additives as discussed below. In accordance with a preferred embodiment, the anionic surfactant is selected from the group consisting of Sodium Dodecylbenzenesulfonate (SDBS), ethoxylated alcohol, Sodium Bis(2-Ethylhexyl) Sulphosuccinate (Sodium Dioctyl Sulphosuccinate (DOSS) or Docusate Sodium), Alkyldiphenyloxide Disulfonate, and Alkyl Benzene sulfonate. In accordance with a preferred embodiment, the non-ionic surfactant is selected from the group consisting of glycol ether and dimethylamides of unsaturated fatty acid. In practice, the cationic and anionic ends of the impregnation enhancing surfactant composition help to solubilize size (synthetic esters-oil), assist in the reaction with cellulose OH in pulp, enhance absorption, and improve resin hold out.

As with the prior embodiment, various additives may be added to the impregnation enhancing surfactant composition. Glycol ether, such as Tripropylene Glycol n-Butyl Ether (TpNB) or Dipropylene Glycol n-Butyl Ether (DpNB), can be used at 0.25% maximum level to ensure the water from the processing reaction is stored in additives as a plasticizer. A release aid in an amount up to a 0.2% maximum may be incorporated into the sulfonated surfactant as it helps flash from laminate pressing not to bond to the press plate. Fillers, such as Wollastanite, at less than 5 microns, may be added as it helps resin strength and allows the recycled fiber to be more compatible with manufacturing in accordance with the present invention. Fillers, such as Wollastanite, also aid in improving laminate thickness by 2 to 5%, as does hardwood due to higher fiber content per gram.

The anionic and non-ionic surfactants of the impregnation enhancing surfactant composition need to be balanced to create lower surface energy and fiber activity to saturate resin as an encapsulant on the fiber. This is essential to kill the sizing in water used in liner making and help fiber strength. Most recycled fibers do not have surface energy for resin wet-out.

The typical dosage of surfactant in the pulp before paper making is 2±1 pounds/ton of pulp. In accordance with one preferred embodiment, DOSS surfactant, at a rate of 1.0±0.3 pounds per ton, is added in 2 gallons hot water before adding to thick pulp or fan pump, Sodium Sulfite (sulfite residual pulp), at a rate of 0.125±20% pounds per ton, is dissolved in 2 gallons hot water above/helps resin reaction/lightens, and MgO—$nMg(OH)_2$ (like adding Talc), is added at a rate of 0.075±20% pounds per ton, is dissolved in 2 gallons hot water above/cure with cross-link. The Sulfite and Mg ions react specifically to wet and improve the composite laminate performance and longevity of treated sheet with cure progressing at the minimal way so blistering on the surface is balanced. The addition of 2% talc helps improve possible tool wear in finished laminate and thermal conductive management like Wollastanite and lesser sticky flash.

Thereafter, the aqueous fluid (or slurry) is delivered to a pulp thickener where excess water is expressed. From the pulp thickener, the slurry is deposited on a conventional former (for example, a Fourdrinier wire cloth) in the mold section of the paper making machine. After forming, the formed slurry is pressed in a baby press which is followed by further pressing in a press section. The formed and pressed slurry is then heated to dry the material and produce a self-sustaining web of paper. This is accomplished in the pre-dryer section, the M.G. section (that is, a cylinder producing desirable surface characteristics) and the post-dryer section using conventional equipment and techniques.

The treated web of paper is subjected to a calendar section (or machine), a pope reel section and a sheet cutter which ultimately process the paper in a conventional manner using well known equipment. In the sheet cutter, the treated web of paper is cut into appropriate lengths and widths to form the treated Kraft paper that is ultimately used in accordance with the present invention as the core sheet.

Once the core paper is manufactured, it is impregnated with a lignin-derived resin composition as described above in a generally conventional manner. The resin solids content of the lignin-derived resin composition ultimately used in impregnating core paper manufactured in accordance with the present invention is 53±4%. With such a resin content, when used in conjunction with core paper manufactured with the impregnation enhancing surfactant composition as described herein, there is no slowdown in impregnation. Further still, the impregnation enhancing surfactant composition of the present invention helps water removal in a dryer used in the fabrication process. Further, and in accordance with a preferred embodiment, the resin treating of Kraft paper is 30±4% resin coated (RC), the Volatiles are at 6.0±0.5%, and the flow must be less than 2%. Further still, the addition of fatty ester and amine, such as Munzing's Fentak 86306H, help as indicated earlier.

While the lignin-derived resin composition of the present invention is disclosed above for use with the core paper, the core paper could be impregnated with conventional phenol formaldehyde resin.

It is appreciated resin viscosity and a water-based system all help more in filler extensions if recycled fiber and or "clay" fillers are used. Further, it is appreciated that the molecular weight of resin plays a role, and typical saturating resin molecular weight varies from 180 to 550 in Dalton units. The molecular weight affects saturation at high molecular weight, but if para groups are more than ortho groups it can be controlled by the pH and temperature of the resin.

The addition of the impregnation enhancing surfactant composition in accordance with the present invention helps raise resin flow and improves the strength, bond, and longevity of B-staged décor or core paper. The addition of the impregnation enhancing surfactant composition in accordance with the present invention also helps improve the flashpoint of reactive phenolic resin and, thereby, reduces press time by 15%. In fast-cycle and Continuous Pressure Laminate (CPL) presses it will be highly effective, and can produce better results than siloxane additives.

Once the appropriate layers of the laminate are formed, the sheets are stacked in a conventional manner, and the laminate lay-up is heated and pressed. In accordance with an embodiment of the present disclosure, the layers are first stacked and placed between steel plates. The laminate stack is then subjected to temperatures in the range of 130° C. to 160° C., and pressure of about 20 kg/cm$^2$ to 100 kg/cm$^2$ for a time sufficient to consolidate the laminate and cure the resins (generally about 20 minutes to 60 minutes). The pressure and heat force the resin in the paper sheets to flow, cure and consolidate the sheets into a unitary laminated mass referred to in the art as a decorative high-pressure decorative laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

The laminate is then cooled for approximately 10 minutes under pressure before it is ready for further processing in preparation for its use in the manufacture of various products. During this last operation, the surface is in contact with a plate or a release paper that gives the material the final texture.

The resulting high-pressure decorative laminate meets the standard EN 438. The high-pressure decorative laminate of the present invention also allows a dramatic reduction in phenol needed to produce the decorative high-pressure laminates. In addition, the free phenol of such resins is very low.

While specific temperatures, pressures and times are described above, it should be appreciated that a variety of pressing techniques may be used without departing from the spirit of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A high-pressure decorative laminate, comprising:
a decorative layer; and
a core layer composed of at least one resin impregnated sheet of core paper, which is impregnated with a resin composition, the resin composition comprising a resin and lignin derivatives;
wherein the resin composition is prepared according to a method comprising:
mixing and cooking ammonium lignosulfonate, acetic acid, and methanol;
adding KOH or MgO and epicholorohydrin;
cooking the mixture;
mixing and cooking, with the mixture produced above, water, dioctyl sulfosuccinate sodium salt, resin, KOH, glyoxal, and methanol; and
adjusting to desired pH and viscosity.

2. The high-pressure decorative laminate according to claim 1, wherein the lignin derivatives are lignosulfonate and kraft lignin.

3. The high-pressure decorative laminate according to claim 2, wherein the lignosulfonate is ammonium lignosulfonates.

4. The high-pressure decorative laminate according to claim 1, wherein the decorative layer and the resin impregnated core sheet are layered to form a laminate lay-up and the laminate lay-up is heated and pressed to consolidate and cure the high-pressure laminate.

5. The high-pressure decorative laminate according to claim 4, further including an overlay paper layer.

6. The high-pressure decorative laminate according to claim 1, wherein the core layer includes two sheets of 160 to 550 grams/meter$^2$ resin impregnated Kraft paper.

7. The high-pressure decorative laminate according to claim 6, wherein the Kraft paper is impregnated with the resin composition and is partially cured.

8. The high-pressure decorative laminate according to claim 7, wherein the Kraft paper is impregnated with a resin content of approximately 28% to 37%.

9. The high-pressure decorative laminate according to claim 1, wherein the core layer includes an impregnation enhancing surfactant composition including an anionic surfactant and a non-ionic surfactant.

10. The high-pressure decorative laminate according to claim 1, wherein the core paper includes no more than 50% recycled materials.

11. The high-pressure decorative laminate according to claim 10, wherein the core paper includes an impregnation enhancing surfactant composition including an anionic surfactant and a non-ionic surfactant.

* * * * *